US008185542B1

(12) United States Patent
Vanyo et al.

(10) Patent No.: US 8,185,542 B1
(45) Date of Patent: *May 22, 2012

(54) STORED PROCEDURE INTERFACE

(75) Inventors: Tadd E. Vanyo, New Brighton, MN (US); Craig D. Hanson, St. Paul, MN (US); Neil A. Lambert, Ham Lake, MN (US); Michael F. Parenteau, Roseville, MN (US)

(73) Assignee: Unisys Corporation, Blue Bell, PA (US)

( * ) Notice: Subject to any disclaimer, the term of this patent is extended or adjusted under 35 U.S.C. 154(b) by 2098 days.

This patent is subject to a terminal disclaimer.

(21) Appl. No.: 10/849,511

(22) Filed: May 19, 2004

(51) Int. Cl.
*G06F 7/00* (2006.01)
*G06F 17/30* (2006.01)
(52) U.S. Cl. ........................................ 707/762; 707/736
(58) Field of Classification Search .................. None
See application file for complete search history.

(56) References Cited

U.S. PATENT DOCUMENTS

| 6,240,417 B1 * | 5/2001 | Eastwick et al. ............... 707/10 |
| 2004/0078374 A1 * | 4/2004 | Hamilton ........................ 707/10 |
| 2004/0103147 A1 * | 5/2004 | Flesher et al. ................. 709/204 |

* cited by examiner

*Primary Examiner* — Rehana Perveen
*Assistant Examiner* — Raheem Hoffler
(74) *Attorney, Agent, or Firm* — Robert P. Marley

(57) ABSTRACT

An apparatus for and method of utilizing an Internet terminal coupled to the world wide web to access a legacy data base management system having a dialog-based request format to prepare, modify, and execute stored procedures. The user request is passed to the legacy data base management system via the Internet. The command type is determined whereby list, parameter, column, and execute commands are defined. In response to the user request, the scripted procedure is accessed, prepared, modified, or executed, as appropriate. Invalid and/or undefined requests result in an error response. Valid and defined requests result in performance of the requested command and transfer of an appropriate response to the user terminal.

16 Claims, 17 Drawing Sheets

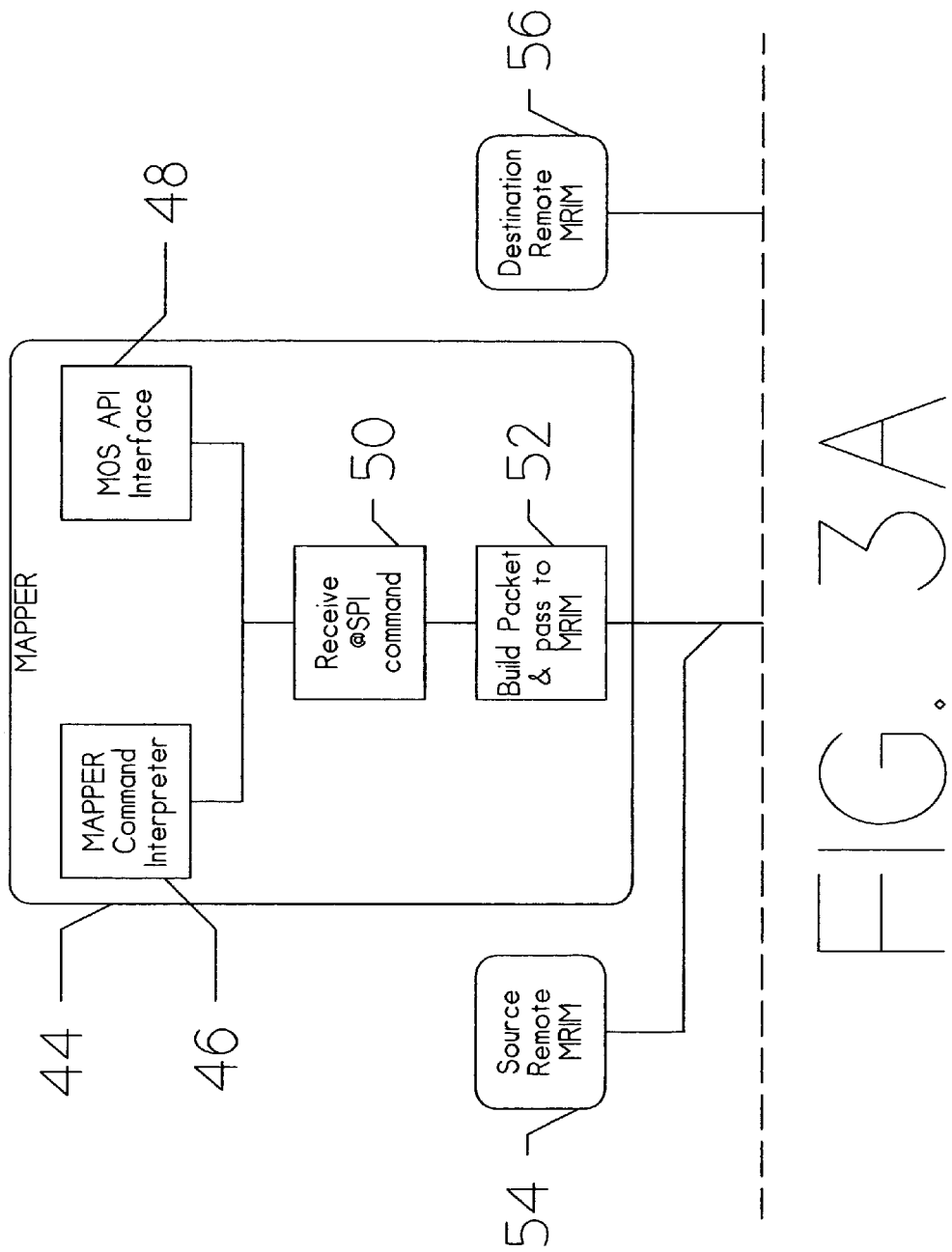

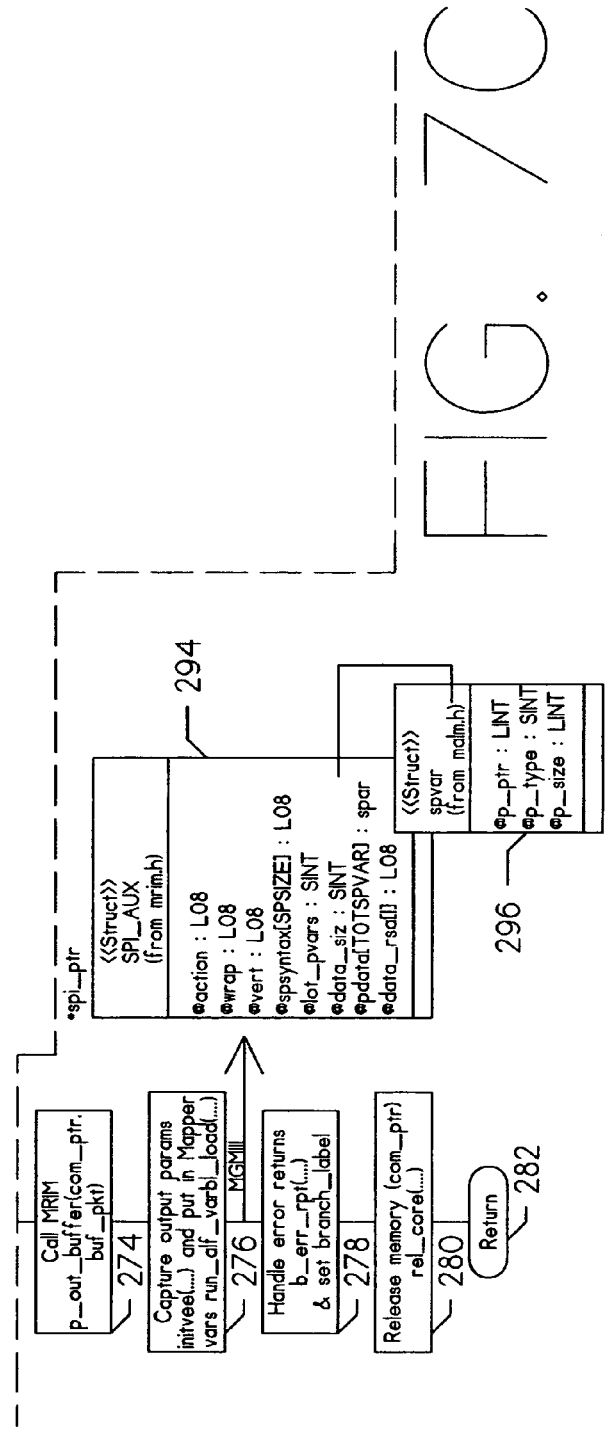

STORED PROCEDURE INTERFACE

CROSS REFERENCE TO CO-PENDING APPLICATIONS

U.S. patent application Ser. No. 09/188,649, filed Nov. 9, 1998, and entitled, "Cool ICE Column Profiling"; U.S. patent application Ser. No. 10/849,473, filed May 19, 2004, entitled, "Cool ICE OLEDB Consumer Interface"; and U.S. patent application Ser. No. 09/188,725, filed Nov. 9, 1998, and entitled, "Cool ICE State Management" are commonly assigned co-pending.

BACKGROUND OF THE INVENTION

1. Field of the Invention

The present invention generally relates to data base management systems and more particularly relates to enhancements for providing access to data base management systems via Internet user terminals using stored procedures.

2. Description of the Prior Art

Data base management systems are well known in the data processing art. Such commercial systems have been in general use for more than 20 years. One of the most successful data base management systems is available from Unisys Corporation and is called the Classic MAPPER® data base management system. The Classic MAPPER system can be reviewed using the Classic MAPPER User's Guide which may be obtained from Unisys Corporation.

The Classic MAPPER system, which runs on proprietary hardware also available from Unisys Corporation and on an industry compatible personal computer under a Windows Server operating system, provides a way for clients to partition data bases into structures called filing cabinets and drawers, as a way to offer a more tangible format. The BIS (Business Information System) data base manager utilizes various predefined high-level instructions whereby the data base user may manipulate the data base to generate human-readable data presentations called "reports". The user is permitted to prepare lists of the various predefined high-level instructions into data base manager programs called "BIS Runs". Thus, users of the Classic MAPPER system may create, modify, and add to a given data base and also generate periodic and aperiodic reports using various BIS Runs.

However, with the Classic MAPPER system, as well as with similar proprietary data base management systems, the user must interface with the data base using a terminal coupled directly to the proprietary system and must access and manipulate the data using the BIS Run command-language of Classic MAPPER. Ordinarily, that means that the user must either be co-located with the hardware which hosts the data base management system or must be coupled to that hardware through dedicated telephone, satellite, or other data links. Furthermore, the user usually needs to be schooled in the command language of Classic MAPPER (or other proprietary data base management system) to be capable of generating BIS Runs.

Since the advent of large scale, dedicated, proprietary data base management systems, the Internet or world wide web has come into being. Unlike closed proprietary data base management systems, the Internet has become a world wide bulletin board, permitting all to achieve nearly equal access using a wide variety of hardware, software, and communication protocols. Even though some standardization has developed, one of the important characteristics of the world wide web is its ability to constantly accept new and emerging techniques within a global framework. Many current users of the Internet have utilized several generations of hardware and software from a wide variety of suppliers from all over the world. It is not uncommon for current day young children to have ready access to the world wide web and to have substantial experience in data access using the Internet.

Thus, the major advantage of the Internet is its universality. Nearly anyone, anywhere can become a user. That means that virtually all persons are potentially Internet users without the need for specialized training and/or proprietary hardware and software. One can readily see that providing access to a proprietary data base management system, such as Classic MAPPER, through the Internet would yield an extremely inexpensive and universally available means for accessing the data which it contains and such access would be without the need for considerable specialized training.

There are two basic problems with permitting Internet access to a proprietary data base. The first is a matter of security. Because the Internet is basically a means to publish information, great care must be taken to avoid intentional or inadvertent access to certain data by unauthorized Internet users. In practice this is substantially complicated by the need to provide various levels of authorization to Internet users to take full advantage of the technique. For example, one might have a first level involving no special security features available to any Internet user. A second level might be for specific customers, whereas a third level might be authorized only for employees. One or more fourth levels of security might be available for officers or others having specialized data access needs.

Existing data base managers have security systems, of course. However, because of the physical security with a proprietary system, a certain degree of security is inherent in the limited access. On the other hand, access via the Internet is virtually unlimited which makes the security issue much more acute.

Current day security systems involving the world wide web involve the presentation of a user-id. Typically, this user-id either provides access or denies access in a binary fashion. To offer multiple levels of secure access using these techniques would be extraordinarily expensive and require the duplication of entire databases and or substantial portions thereof. In general, the advantages of utilizing the world wide web in this fashion to access a proprietary data base are directly dependent upon the accuracy and precision of the security system involved.

The second major problem is imposed by the Internet protocol itself. One of the characteristics of the Internet which makes it so universal is that any single transaction in HTML language combines a single transfer (or request) from a user coupled with a single response from the Internet server. In general, there is no means for linking multiple transfers (or requests) and multiple responses. In this manner, the Internet utilizes a transaction model which may be referred to as "stateless". This limitation ensures that the Internet, its users, and its servers remain sufficiently independent during operation that no one entity or group of entities can unduly delay or "hang-up" the communications system or any of its major components. Each transmissions results in a termination of the transaction. Thus, there is no general purpose means to link data from one Internet transaction to another, even though in certain specialized applications limited amounts of data may be coupled using "cookies" or via attaching data to a specific HTML screen.

However, some of the most powerful data base management functions or services of necessity rely on coupling data from one transaction to another in dialog fashion. In fact this linking is of the essence of BIS Runs which assume change of state from one command language statement to the next. True statelessness from a first BIS command to the next or subsequent BIS command would preclude much of the power of Classic MAPPER (or any other modern data base management system) as a data base management tool and would eliminate data base management as we now know it.

A further feature of the "state-managed" legacy data base management systems is the opportunity to define, initialize, and execute stored procedures. These are essentially software programs scripted in the command language of the data base management system which may be defined and later initialized and executed upon a subsequent occasion. The very concept of this functionality is inconsistent with the stateless operation of the Internet.

SUMMARY OF THE INVENTION

The present invention overcomes the disadvantages of the prior art by providing a method of and apparatus for utilizing the power of a full featured data base management system by a user at a terminal coupled to the world wide web or Internet to develop, initialize, and execute stored procedures within a legacy environment. In order to permit any such access, the present invention must first provide a user interface, called a gateway, which translates transaction data transferred from the user over the Internet in HTML (hypertext markup language) format into a format from which data base management system commands and inputs may be generated. The gateway must also convert the data base management system responses and outputs into an HTML document for display on the user's Internet terminal. Thus, as a minimum, the gateway must make these format and protocol conversions. In the preferred embodiment, the gateway resides in the web server coupled to the user via the world wide web and coupled to proprietary data base management system.

To make access to a proprietary legacy data base by Internet users practical, a sophisticated security system is required to prevent intentional or inadvertent unauthorized access to the sensitive data of an organization. As discussed above, such a security system should provide multiple levels of access to accommodate a variety of authorized user categories. In the preferred embodiment of the present invention, rather than defining several levels of data classification, the different classes of users are managed by identifying a security profile as a portion of those service requests requiring access to secure data. Thus, the security profile accompanies the data/service to be accessed. The user simply need provide a user-id which correlates to the access permitted. This permits certain levels of data to be accessed by one or more of the several classes of user.

In the preferred mode of practicing the present invention, each user-id is correlated with a security profile. Upon preparation of the service request which provides Internet access to a given portion of the data base, the service request developer specifies which security profiles are permitted access to the data or a portion thereof. The service request developer can subsequently modify the accessibility of any security profile. The utility of the system is greatly enhanced by permitting the service request developer to provide access to predefined portions of the data, rather than being limited to permit or deny access to all of the data involved.

Whereas the gateway and the security system are the minimum necessary to permit the most rudimentary form of communication between the Internet terminal of the user and the proprietary data base management system, as explained above, the Internet is a "stateless" communication system; the addition of the gateway and the security system do not change this statelessness. To unleash the real power of the data base management system, the communication protocol between the data base and the user requires functional interaction between the various data transfers.

The present invention adds state management to this environment. Instead of considering each transfer from the Internet user coupled with the corresponding server response as an isolated transaction event as defined by the world wide web, one or more related service requests may be functionally associated in a service request sequence as defined by the data base management system into a dialog.

A repository is established to store the state of the service request sequence. As such, the repository can store intermediate requests and responses, as well as other data associated with the service request sequence. Thus, the repository buffers commands, data, and intermediate products utilized in formatting subsequent data base management service requests and in formatting subsequent HTML pages to be displayed to the user.

The transaction data in HTML format received by the server from the user, along with the state information stored in the repository, are processed by a service handler into a sequence of service requests in the command language of the data base management system. Sequencing and control of the data base management system is via an administration module.

Through the use of the repository to store the state of the service request sequence, the service handler to generate data base management command language, and the administration module, the world wide web user is capable of performing each and every data base management function available to any user, including a user from a proprietary terminal having a dedicated communication link which is co-located with the proprietary data base management system hardware and software. In addition, the data base management system user at the world wide web terminal is able to accomplish this in the HTML protocol, without extensive training concerning the command language of the data base management system.

In accordance with the preferred embodiment of the present invention, a new command, @SPI (stored procedure interface) is defined for the Business Information Server (BIS)/Cool ICE system. The new command has two primary modes of operation. First, the command provides the ability to execute a specified stored procedure and return the results. This includes the handling of rowsets, input variables, output variables, and input/output variables. Secondly, the command provides a method to query and return meta-data about stored procedures in a data base catalog. The meta-data will provide the available stored procedures as well as information about the parameters for the stored procedures.

Meta-data are data about data. It is a way of documenting data sets. The information contained in meta-data documents the creation of a data set and gives an idea of what the cartographic product to which it is attached was designed to do.

Rowsets are the central objects that enable DB (data base) components to expose and manipulate data in tabular form. A rowset object is a set of rows in which each row has columns of data. For example, providers present data, as well as meta-data, to consumers in the form of rowsets. Query processors present query results in the form of rowsets. The use of rowsets throughout data base systems makes it possible to aggregate components that consume or produce data through the same object.

Without the present invention, the user must write the C code and make the proper API (Application Program Interface) calls to execute the stored procedure as well as handle input, output, and input/output variables. This is a difficult process and requires in depth knowledge of the data base API interface, in addition to the pitfalls of having to develop application code (memory allocation, pointer manipulation, configuring enough variable space, handling input/output variables, etc.). In addition to writing the application code and submitting the proper stored procedure command, users previously had no real mechanism to manipulate any data that is retrieved from the data source.

The present invention provides users the ability to execute a specified stored procedure as well as handle rowsets, input variables, output variables, and input/output variables without having to develop the application code themselves. Developing the code is a very cumbersome process with a lot of room for errors. Furthermore, the developer must be very knowledgeable concerning the API interface in order to correctly make proper calls.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein:

FIG. 3, including FIGS. 3A and 3B, is functional flow diagram for the @SPI command;

FIG. 7, including FIGS. 7A, 7B, and 7C, is a flow chart of the n_spi_cmd( ) process flow;

DETAILED DESCRIPTION OF THE PREFERRED EMBODIMENTS

The present invention is described in accordance with several preferred embodiments which are to be viewed as illustrative without being limiting. These several preferred embodiments are based upon Series 2200 hardware and operating systems, the Classic MAPPER data base management system, and the BIS/Cool ICE software components, all available from Unisys Corporation. Also commercially available are industry standard personal computers operating in a Windows environment.

Figure 1:
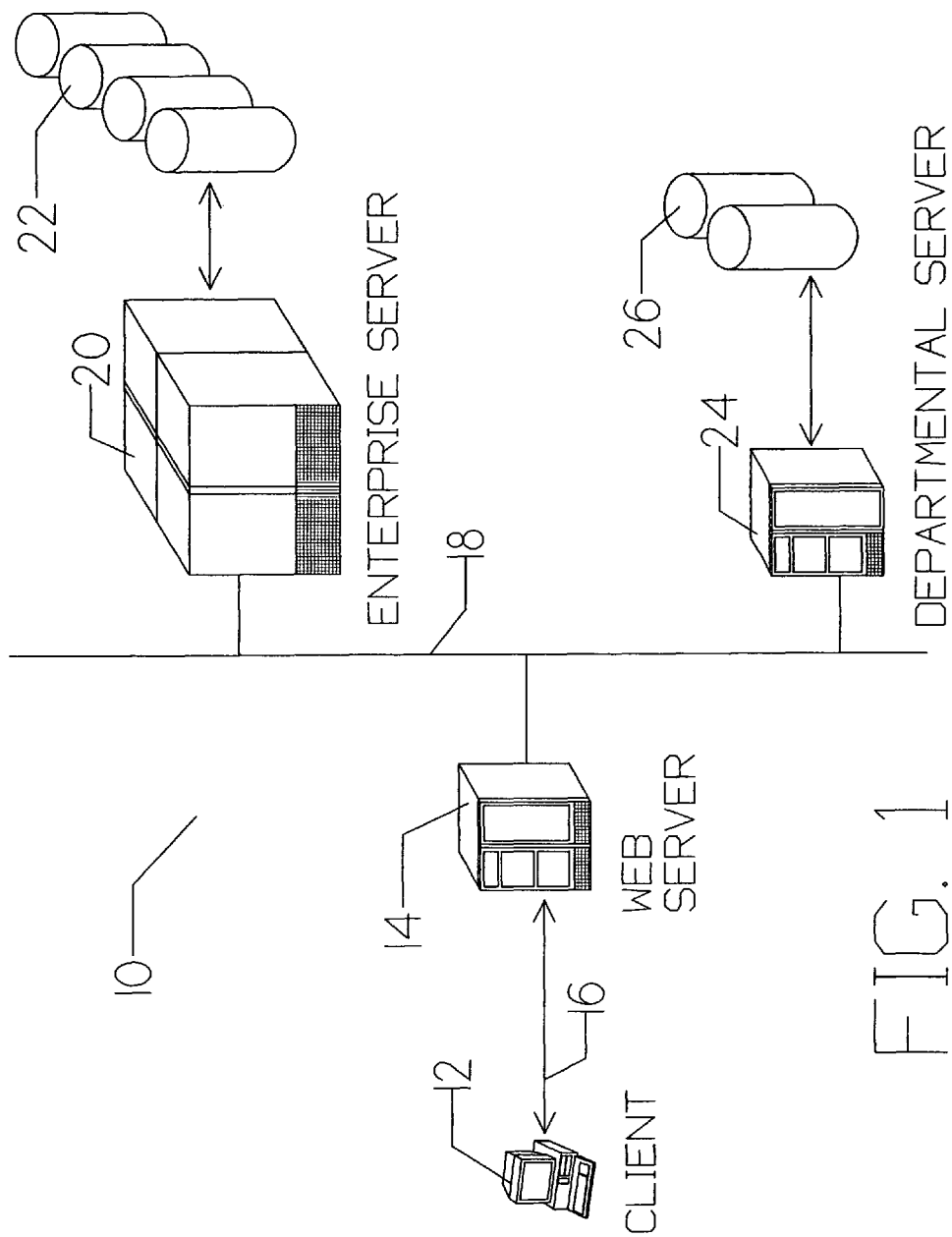
FIG. 1 is a pictographic view of the hardware of the preferred embodiment.

FIG. 1 is a pictorial diagram of hardware suite 10 of the preferred embodiment of the present invention. The client interfaces with the system via Internet terminal 12. Preferably, Internet terminal 12 is an industry compatible, personalized computer having a current version of the Windows operating system and suitable web browser, all being readily available commercial products. Internet terminal 12 communicates over world wide web access 16, or other publicly accessible digital data communication network, using standardized HTML protocol, via Web Server 14.

The BIS/Cool ICE system is resident in Enterprise Server 20 and accompanying storage subsystem 22, which is coupled to Web Server 14 via WAN (Wide Area Network) 18. In the preferred mode, Web Server 14 is owned and operated by the enterprise owning and controlling the proprietary legacy data base management system. Web Server 14 functions as the Internet access provider for Internet terminal 12 wherein world wide web access 16 is typically a dial-up telephone line. This would ordinarily be the case if the shown client were an employee of the enterprise. On the other hand, web server 14 may be a remote server site on the Internet if the shown client has a different Internet access provider. This would ordinarily occur if the shown client were a customer or guest.

In addition to being coupled to WAN 18, Enterprise Server 20, containing the BIS/Cool ICE system, is coupled to departmental server 24 having departmental server storage facility 26. Additional departmental servers (not shown) may be similarly coupled. The enterprise data and enterprise data base management service functionality typically resides within enterprise server 20, departmental server 24, and any other departmental servers (not shown). Normal operation in accordance with the prior art would provide access to this data and data base management functionality to users located on WAN 18.

In the preferred mode of the present invention, access to this data and data base management functionality is also provided to users (e.g., Internet terminal 12) coupled to World Wide Web access 16. As explained below in more detail, web server 14 provides this access utilizing the BIS/Cool ICE system.

Figure 2:
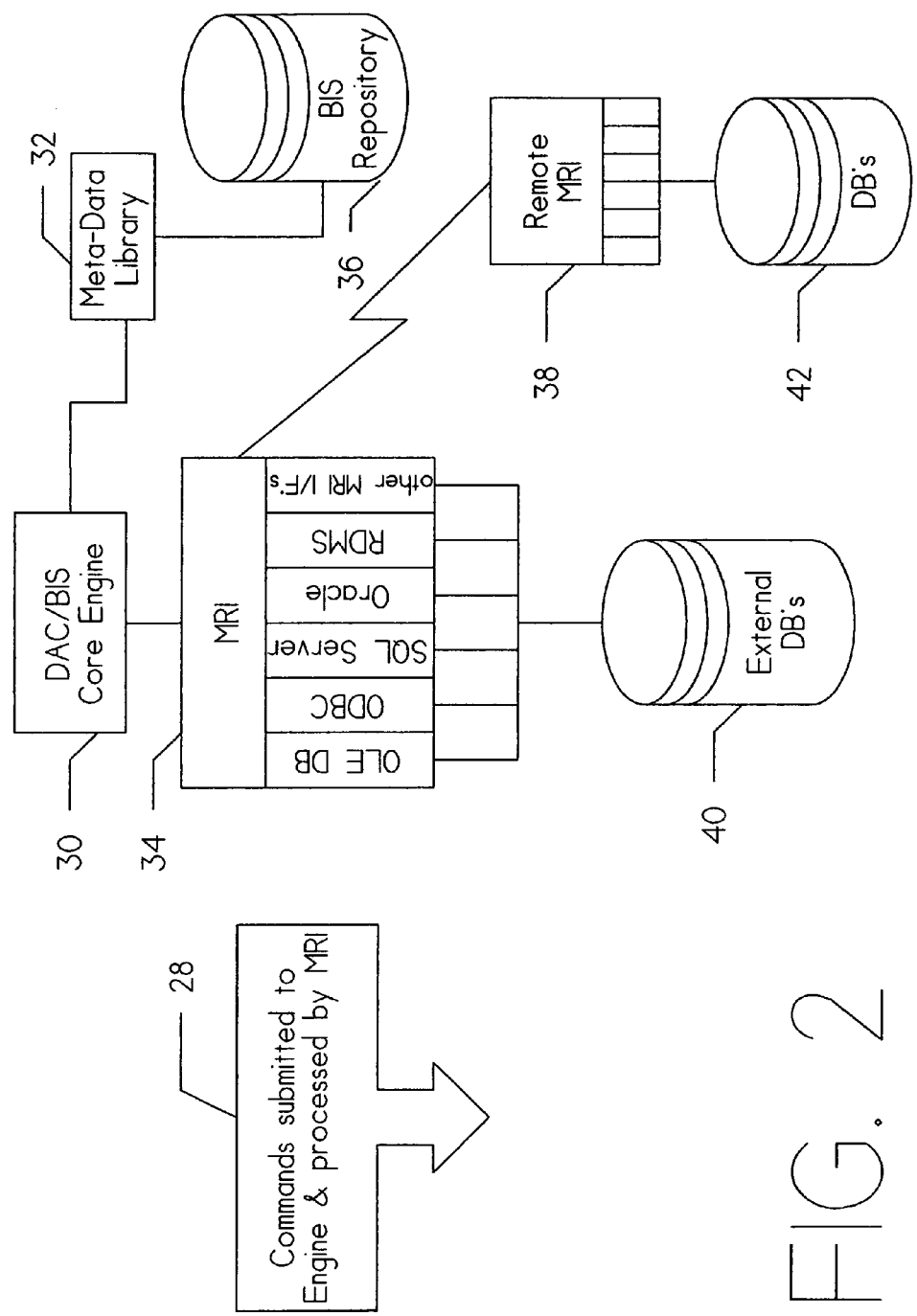
FIG. 2 is a pictorial diagram of the @SPI command process flow.

FIG. 2 is a functional diagram showing the major components of the @SPI (stored procedure interface) command process flow. This command is a part of the MRI (BIS Relational Interface) set of commands and combines many of the attributes of the previously existing @FCH (relational aggregate fetch) and @SQL (standard query language) commands. However, it is specifically targeted to executing stored procedures.

Command set 28 represents the commands defined for processing by MRI. In addition to @SPI, @FCH, and @SQL, @LGN (log on), MRI recognizes @LGF (log off), @DDI (data definition information), @RAM (relational aggregate modify), @TRC (trace relational syntax), @MQL (submit SQL syntax to a BIS data base) as the remaining commands. DAC/BIS core Engine 30 provides the basic logic for decode and execution of these commands. MRI 34 has relational access to data in the external databases 40 via the illustrated data base management formats. In addition, MRI 34 can call upon remote MRI 38 to make similar relational access of remote data bases 42.

DAC/BIS core engine 30 executes commands utilizing meta-data library 32 and BIS repository 36. Meta-data library 32 contains information about the data within the data base(s). BIS repository 36 is utilized to store command language script and state information for use during command execution.

The @SPI command has the following basic format:
@SPI, c, d, lab, db, edsp?, action, wrap, vert 'sp-syntax', vpar1 ..., vparN, typ1, ... typN. Fields c and d refer to the cabinet and drawer, respectively, which hold the result. The lab field contains a label "go to" if the status in the vstat variable specifies other than normal completion. The required "db" field provides the data base name. The "edsp?" field specifies what is to be done with the result if an error occurs during execution.

The sub-field labeled "action" defines what action is to be performed. The options include execution, return of procedures lists, etc. The "wrap" sub-field indicates whether to truncate or wrap the results. The "vert" sub-field defines the format of the results. The name of the stored procedure is placed into the "[sp-syntax]" field. The "vpar1" through "vparN" fields provide for up to 78 variables that correspond to stored procedure parameters. Finally, the "typ1" through "typN" fields define the type of each stored procedure parameter.

Figure 3B:
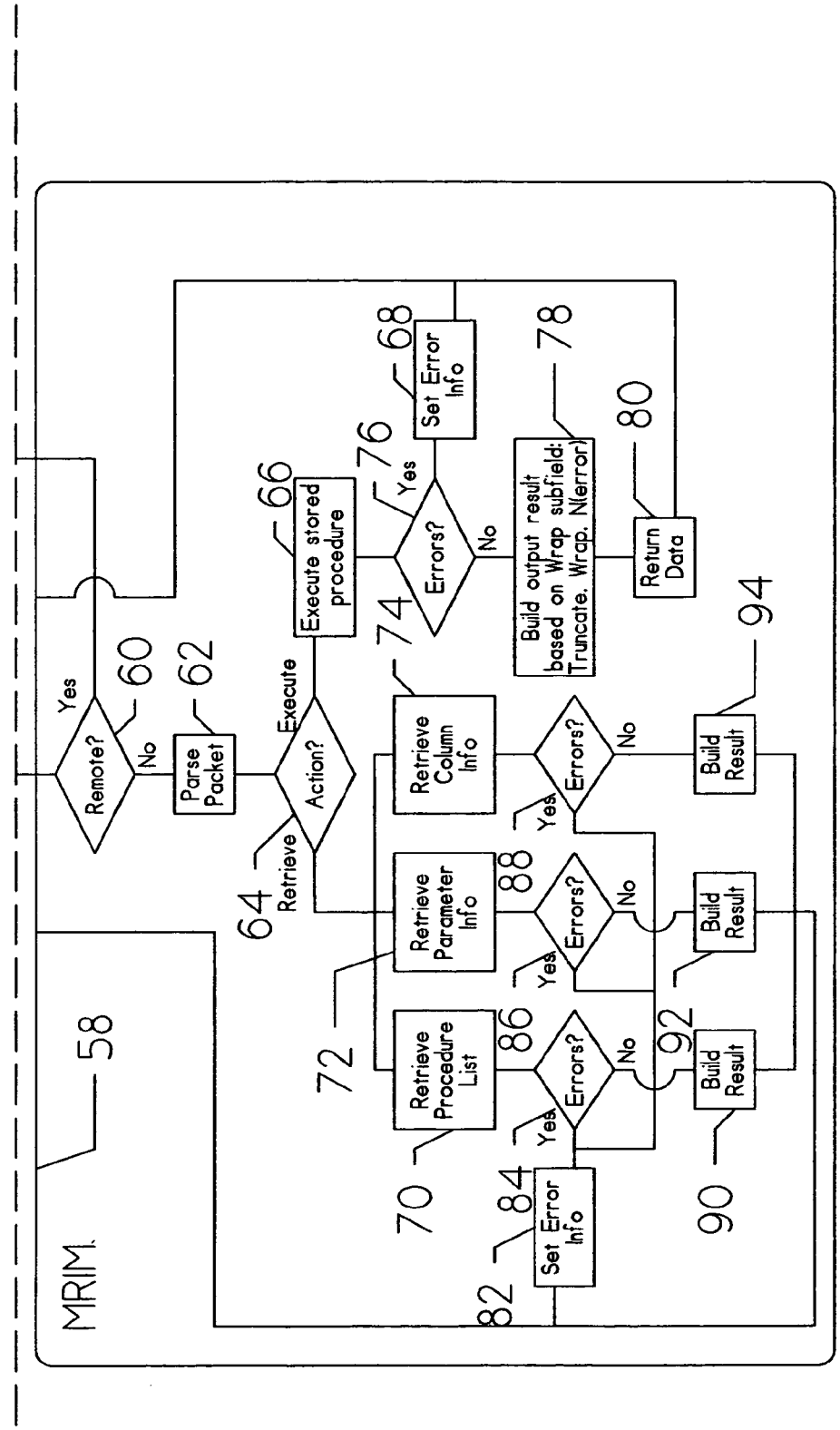

FIG. 3 is a high-level functional flow diagram for the @SPI command. The heart of the system is the BIS Relational Interface Module (MRIM) containing much of the logic for the preferred mode of the present invention. Provided from client are local data/commands from MAPPER 44 and remote data/commands from Source Remote MRIM 54. Remote results are forwarded via Destination Remote MRIM 56.

BIS 44 includes the BIS Command Interpreter and MOS API Interface 48 which provide the @SPI command to Receiver 50. The packet is built by element 52 for transfer to MRIM 58.

MRIM 58 receives remote packets from Source Remote MRIM 54. The @SPI command packet is received by element 60, whether local or remote. Remote packets are forwarded via Destination Remote MRIM 56. Local packets are passed to element 62 for parsing. Control is given to element 64 for switching between retrieve commands and execute commands.

Request packets for retrieval are routed to element 70, 72, or 74 depending upon whether it requests a list, parameter information, or column information, respectively. Upon the appropriate retrieval, elements 84, 86, and 88 look for a retrieval error. If yes, control is given to element 82 for setting the error information before exit. If not, control is given to element 90, 92, or 94 for building of the result packet, before exit.

Element 64 routes execution request packets to element 66 for execution of the stored procedure. Element 76 determines whether an error has occurred. If yes, element 68 sets the error information before exit. If not, element 78 builds the output results packet. Element 80 returns the data before exit.

Figure 4:
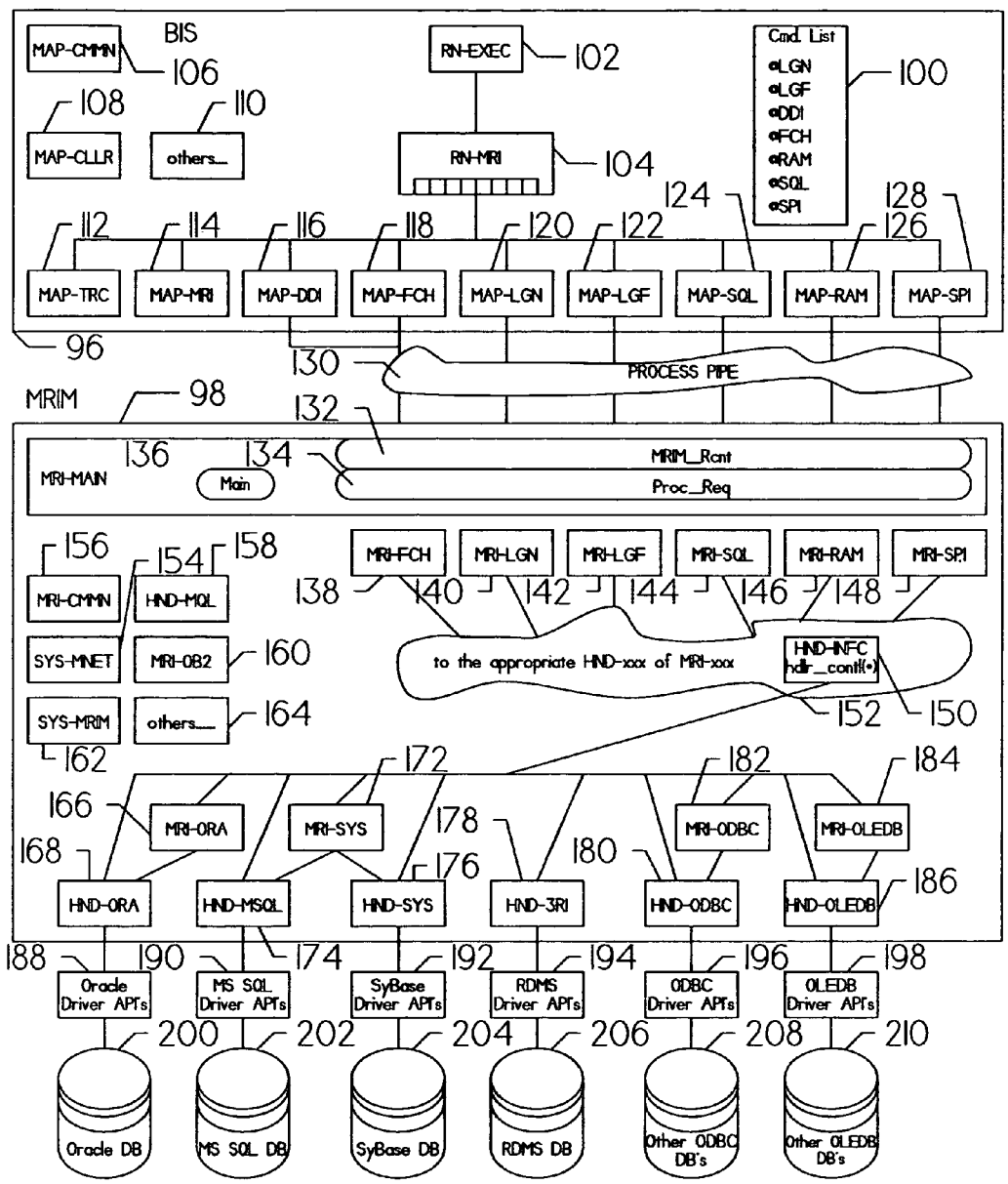
FIG. 4 is a schematic diagram showing the BIS and MRIM components.

FIG. 4 is a detailed block diagram showing the major components of BIS and MRIM as utilized in accordance with the preferred mode of the present invention. BIS 96 receives command packets as MAP-CMMN 106, MAP-CLLr 108, or others 110. Command List 100 specifies which of the commands are valid and to be executed. These are @LGN (log on), @LGF (log off), @DDI (data definition information), @FCH (relational aggregate fetch), @RAM (relational aggregate modify), @SQL (standard query language), and SPI (stored procedure interface). These commands are executed using RN-Exec 102, RN-MRI 104, and specialized elements 116, 118, 120, 122, 124, 126, and 128, whereas elements 112 and 114 handle @TRC (trace relational syntax) and information requests. Packets are prepared for all of the listed commands for transfer via process pipe interface 130 to MRIM 98.

Interface from BIS 96 to MRIM 98 is handled by MRI-Main 136. The incoming packets are routed via MRIM_Rcvr 132 and Proc_Req 134, as appropriate. Each of the listed commands (see list 100) is assigned to the corresponding one of the request handlers 138, 140, 142, 144, 146, and 148 based on command type. After unpacking, switch 152, controlled by element 150, routes the information to the appropriate one(s) of the command handlers 166, 168, 170, 172, 174, 176, 178, 180, 182, 184, and 186. Data base command access is via the appropriate one(s) of the data base interfaces 188, 190, 192, 194, 196, and 198 to the specified one(s) of the available data bases 200, 202, 204, 206, 208, and 210. Internal utilities 154, 156, 158, 160, 162, and 164 assist in this process as needed.

Figure 5:
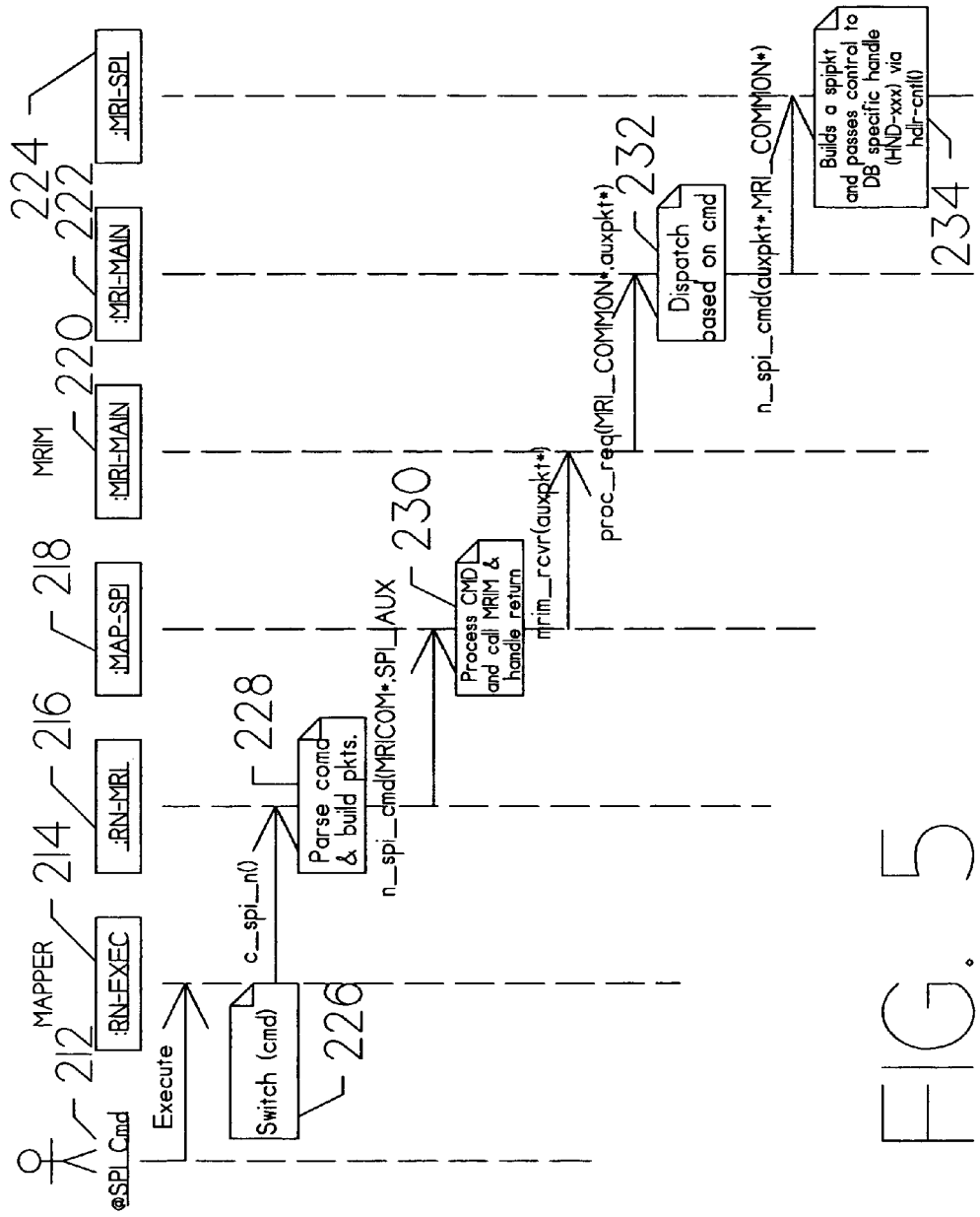
FIG. 5 is a timing diagram showing the @SPI command execution sequence.

FIG. 5 is a timing diagram for the @SPI command execution sequence. The @SPI command is manually initiated at position 212. Execution begins and run execution is initiated at position 214. The switch command 226 is advanced having the form "c_spi_n( )" to position 216. At that point, the command is parsed and the packets built at element 228 and position 216. The information is forwarded as "n_spi_cmd) MRICOM*SPI_AUX)" to position 218, at which time element 230 process the command and calls MRIM.

The command is transferred as "mrim_rcvr(auxpkt*)" to MRI-Main (see also FIG. 4, element 136) at position 220. Reformatting to "proc_req(MRI_COMMON*auxpkt*) is found at position 222, whereat element 232 issued the dispatch based upon the initial command. This is forwarded to position 224 as "n_spi_cmd(auxpkt*MRI_COMMON*)", where at element 234 builds an SPI packet and passes control to the data base specific handler (see also FIG. 4). A detailed description of the functionality of these commands is provided in reference to the remaining drawings.

Figure 6:
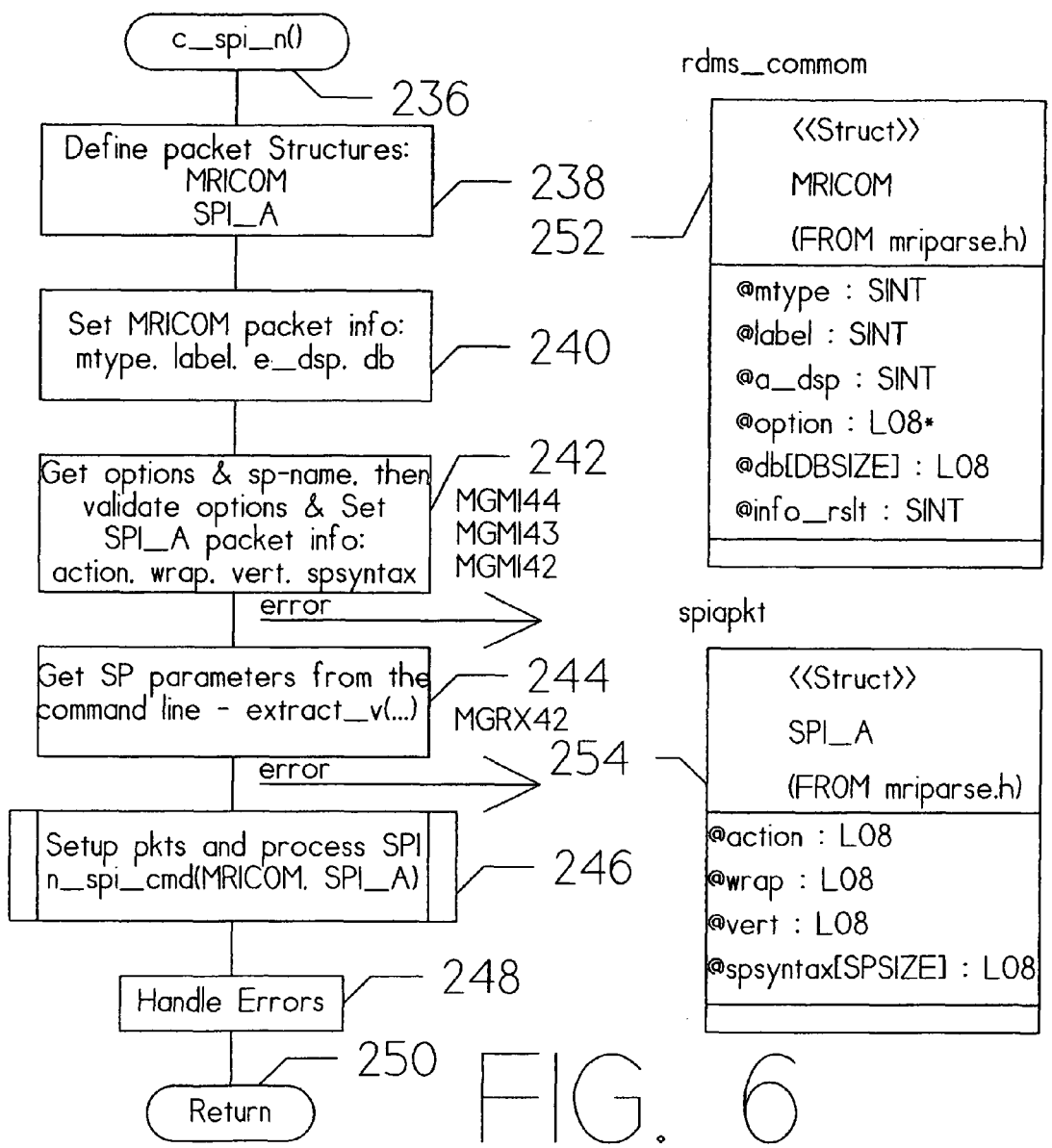
FIG. 6 is a flow chart of the c_spi_n( ) process flow.

FIG. 6 is a detailed flow chart of "c_spi_n( )" (see also FIG. 5 element 226). Entry is via element 236. The packet structures are defined at element 238. Element 240 set the MRI-COM packet information into the appropriate fields (see format 252). The options and sp-syntax are obtained, options validated and packet information entered by element 242 (see format 254). An error exit is provided with the error designations shown for a finding of invalidity.

Element 244 sets the SP parameters and provides an error exit and designation, if required. The packets are setup and processed at element 246. Element 248 handles any errors present. Exit is via return 250.

Figure 7A:
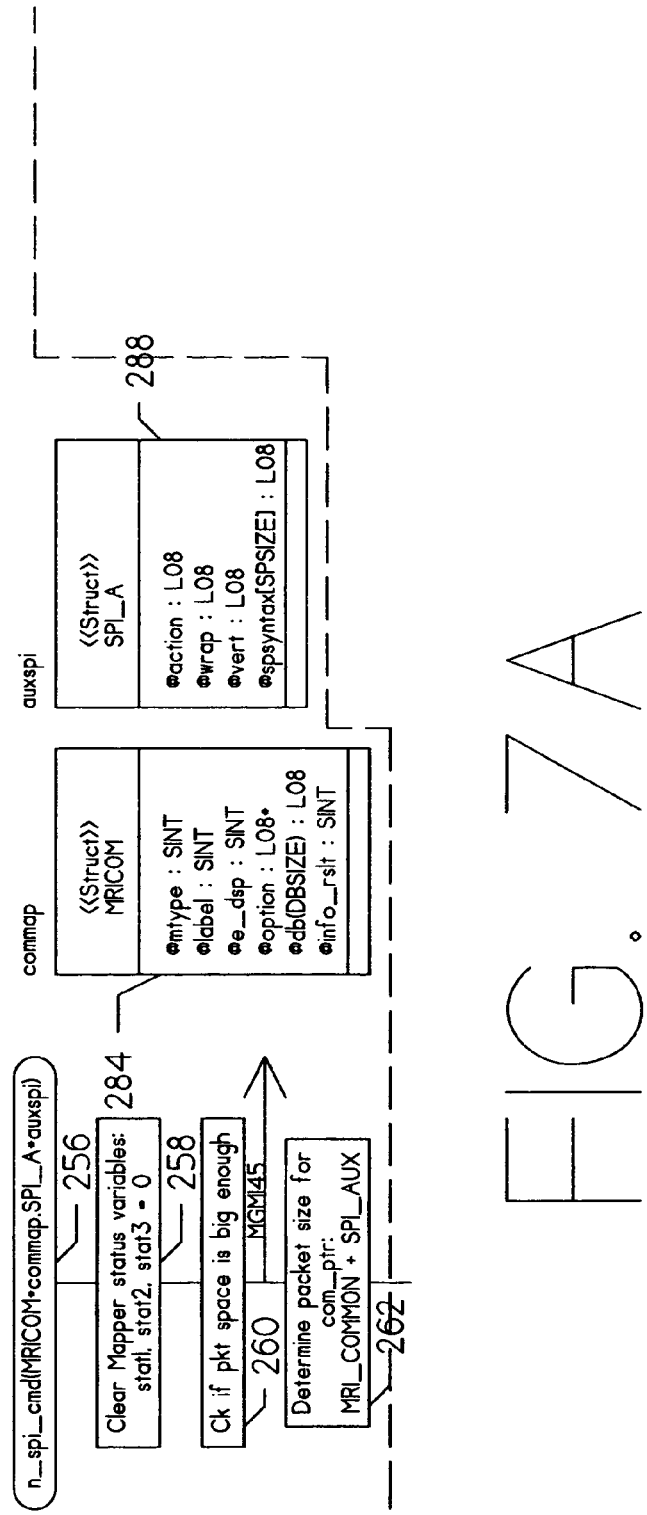
Figure 7B:
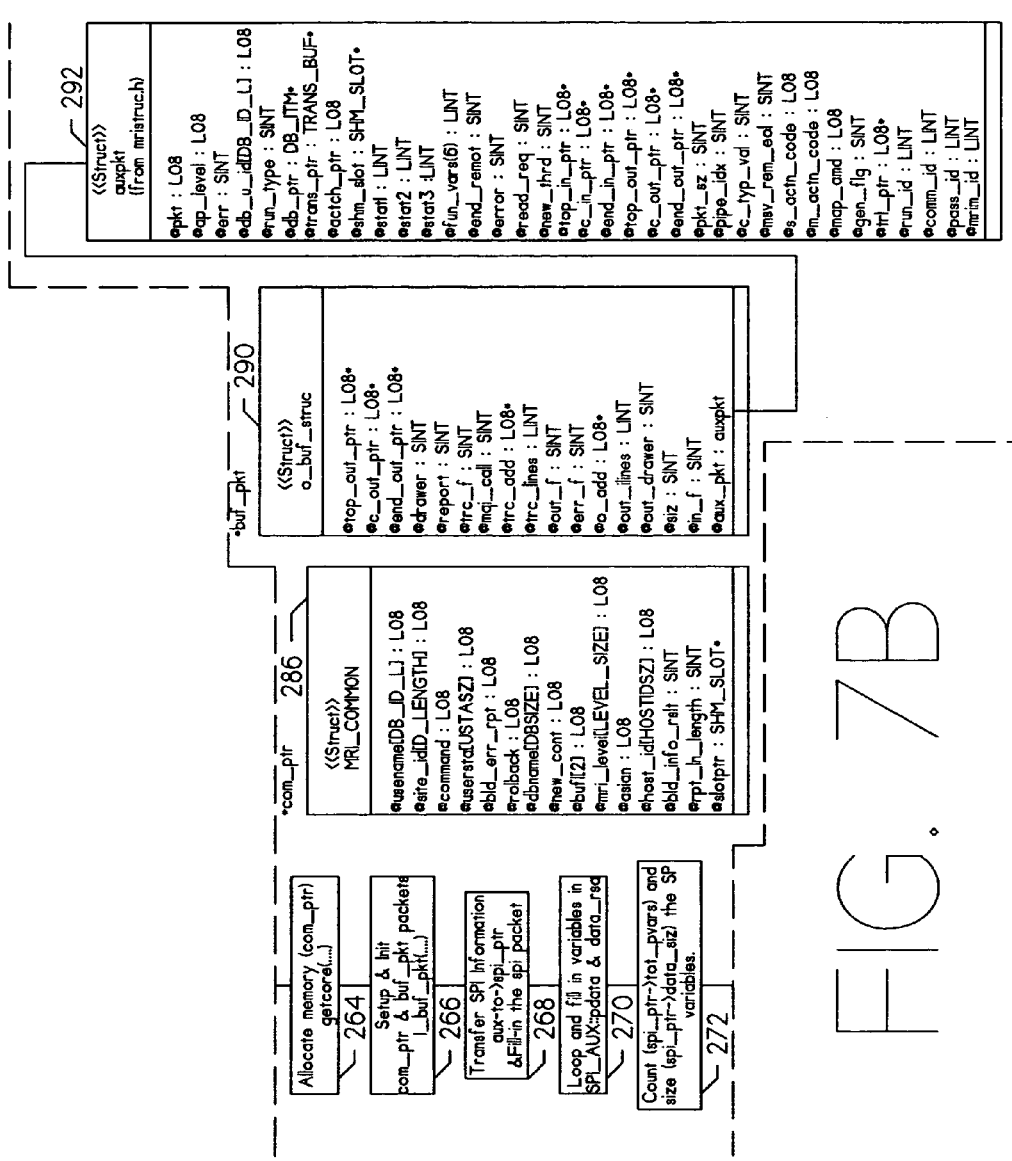

FIG. 7 is a detailed flow chart showing "n_spi_cmd( )" flow (see also FIG. 5, position 216 to 218). Entry is at element 256. Element 258 clears the BIS status variables, and element 260 checks if the packet space is sufficiently large. If not, error message MGM145 is generated. The packet size is determined by element 262 (see also element 284) and allocated by element 264 (see also element 286).

The packets are setup and initialized by element 266. Element 268 transfers the spi information (see also element 294). The variables are entered at element 270 (see also element 296). These variables are counted at element 272 (see also element 288). MRIM is called at element 274 with the packet formatted as shown by element 290. Element 276 captures the output parameters (see also element 294) providing an error exit as shown. The hard error return is via element 278. However, assuming a normal execution sequence, element 280 releases the temporary memory assignment, and normal exit is via element 282.

Figure 8:
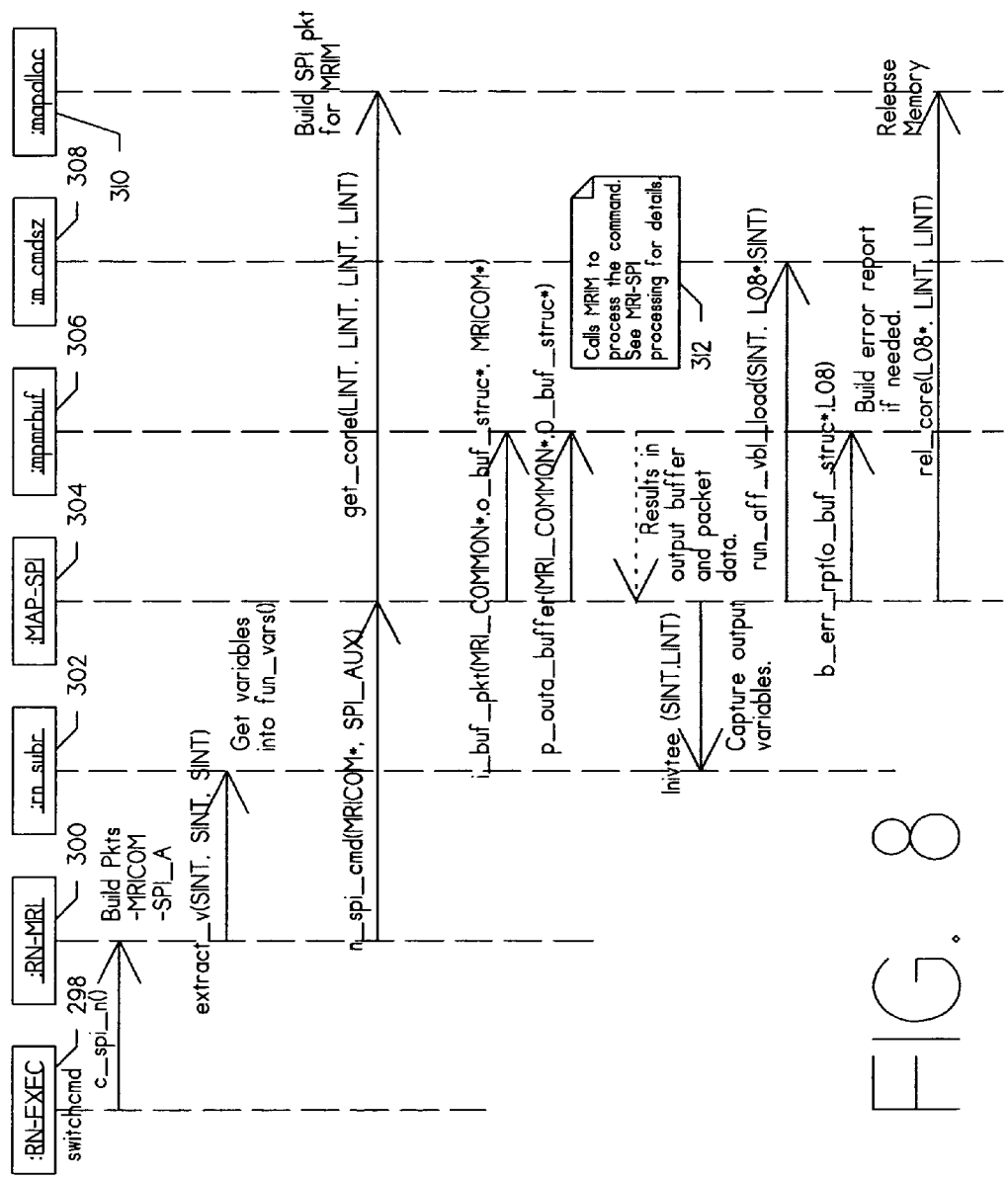
FIG. 8 is a timing diagram showing SPI processing in BIS.

FIG. 8 is a detailed timing diagram showing execution of @SPI within the BIS component. The process is initiated at position 298. The "c_spi_n( )" packet is transferred to the MRI run at position 300. At that point, the MRICOM and SPI_A packets are built. "extract_v(SINT, SINT, SINT)" is transferred to rn_subr at position 302. Next, "n_spi_cmd (MRICOM*, SPI_AUX)" is transferred to MAP-SPI at period 304. The "fun_vars( )" variables are also fetched for transfer at position 304.

From position 304 "get_core(LINT, LINT, LINT, LINT)" is transferred to procedure mapalloc at poisition 310 for building of the SPI packet to be utilized by MRIM. In the interim, "i_buf_pkt (MRI_COMMON*o_buf_struc*.MRICOM*" is transferred from position 304 to position 306. Simultaneously, "p_outa_buffer(MRI_COMMON*0_buf_struce*) is also transferred.

Element 312 calls the MRIM process at position 306. The output buffer results are returned from position 306 to position 304 and from position 304 to position 302, as shown. Transfers "run_aff_vbl_load(Sint, L08*SINT)", "b_err_rpt (o_buf_struc*L08)", and "rel_core(L08*.LINT, LINT)" are initiated at position 304. The error report is built between positions 306 and 308, as needed. The temporary memory assignment is released at position 310.

Figure 9:
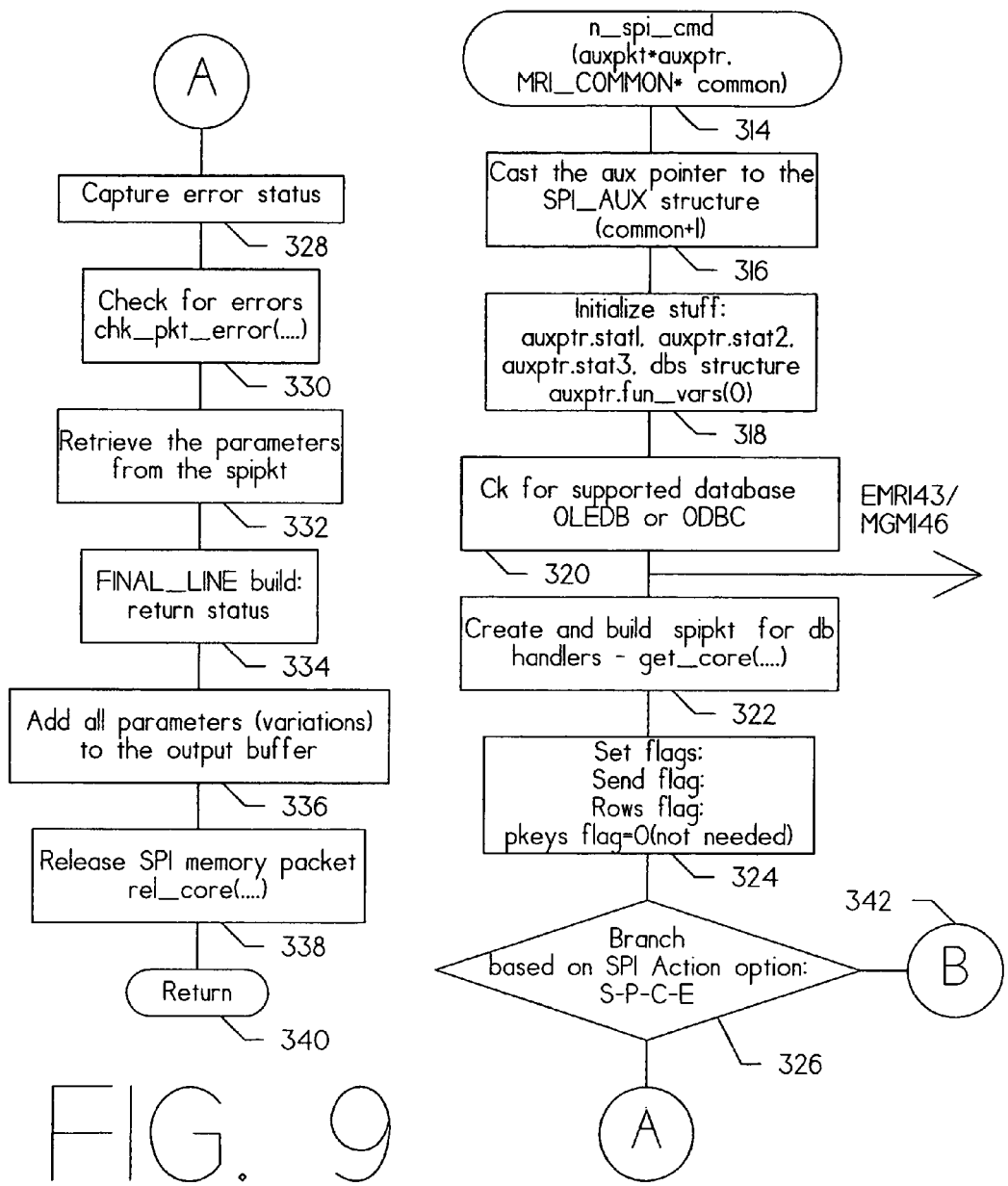
FIG. 9 is a flow chart of the first portion of the n_spi_cmd( ) process flow.

FIG. 9 is a detailed flow diagram for the "n_spi_cmd( )" flow. Entry is via element 314. Element 316 sets the aux pointer to the SPI_AUX structure 294 (see also FIG. 7). Various initialization tasks are performed by element 318. Element 320 checks for supported data base corresponding to @SPI request. An error exit is provided if the request specifies a non-supported data base.

The spi packet is built at element 322. Element 324 performs the setting of various flags. Having initialized the process, element 326 switches to the logic for processing the particular request. Defined are the S, P, C, and E options to be discussed further below. If any of these are requested, control is given to element 342, which continues processing at FIG. 10. If none of these options are requested, the request is in error and control is given to element 328 for capture of the error status. Element 330 checks for "chk_pkt_error( . . . )". The parameters are retrieved from the spi packet at element 332.

Element 334 builds the FINAL LINE return status. The parameters are added to the output buffer at element 336. Element 338 release the temporary memory assignment, and exit is via element 340.

Figure 10:
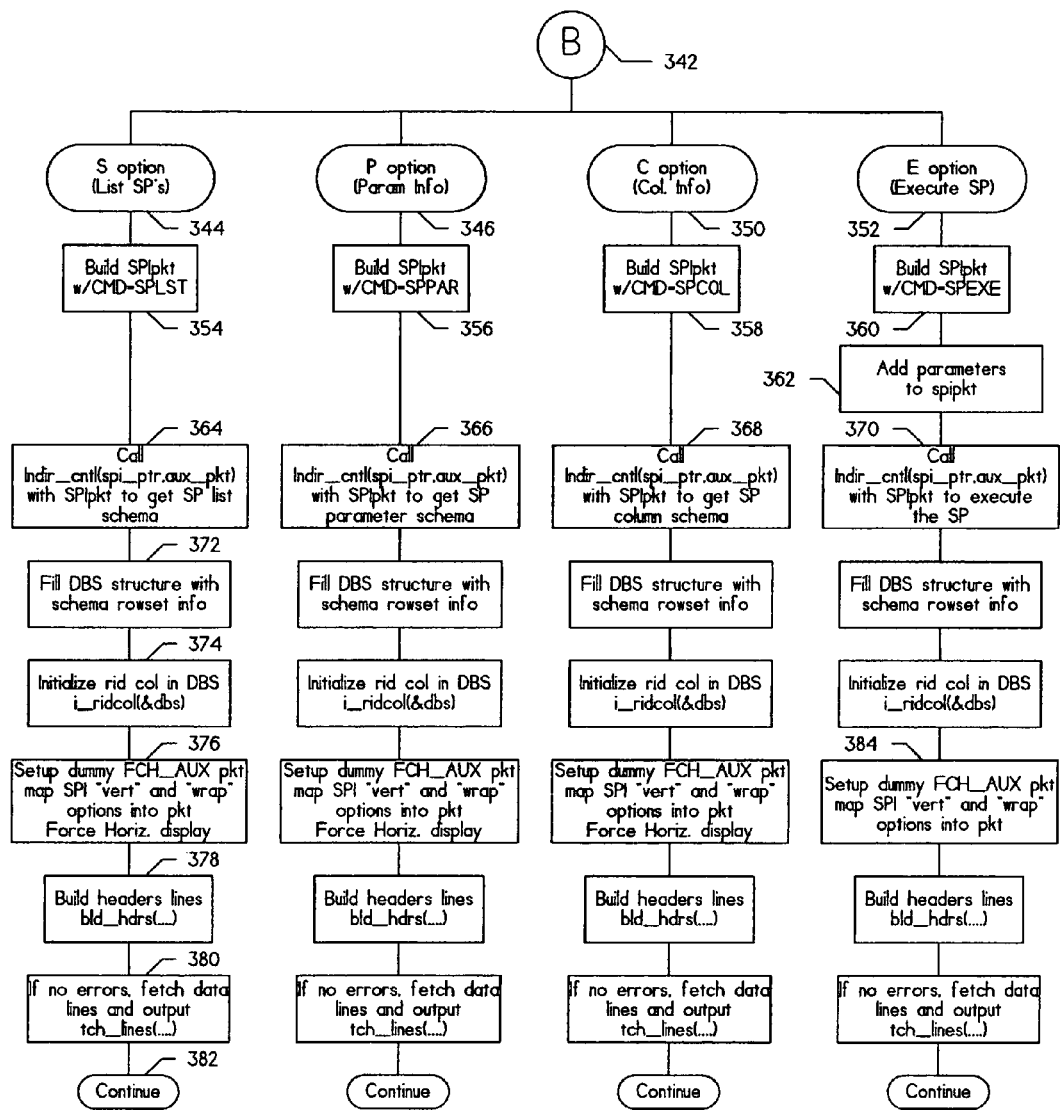
FIG. 10 is a flow chart of the second portion of the n_spi_cmd( ) process flow.

FIG. 10 is a detailed flow chart for the processing of valid SPI requests (see also FIG. 9). As explained above, options S, P, C, and E are defined. Option S (list) is initiated at element 344. Element 354 builds the SPI packet with the list command. A call is made to initiate the list schema at element 364. Element 372 fills the DBS structure with the schema rowset information. The DBS rid col is initialized at element 374. Element 376 sets up the dummy packet and forces the horizontal display. The header lines are built at element 378. If no error is found, element 380 fetches the data and output lines. Exit is from element 382. Processing continues at connector "A" in FIG. 9.

Element 346 initializes the P (i.e., parameter) option. The SPI packet is built with the parameter command at element 356. A call with the parameter schema is made at element 366. The remainder of the P option processing is similar to the S option processing.

The C (i.e., column information) option is initialized at element 350. Element 358 builds the SPI packet with the column command. The call made at element 368 involves the column schema. The remainder of the C option command processing is as discussed above.

Element 352 initiates the E (execution) option processing. Because this option actually performs the execution of the stored procedure, it is somewhat different from the S, P, and C options which are associated with preparation for execution. The SPI packet is built with the execution command at element 360. Element 362 adds the needed execution parameters. A call for the execution is made at element 370. The packet is filled and initialized as discussed above. Element 384 sets up the dummy packet. The remainder of the processing is as discussed above.

Figure 11:
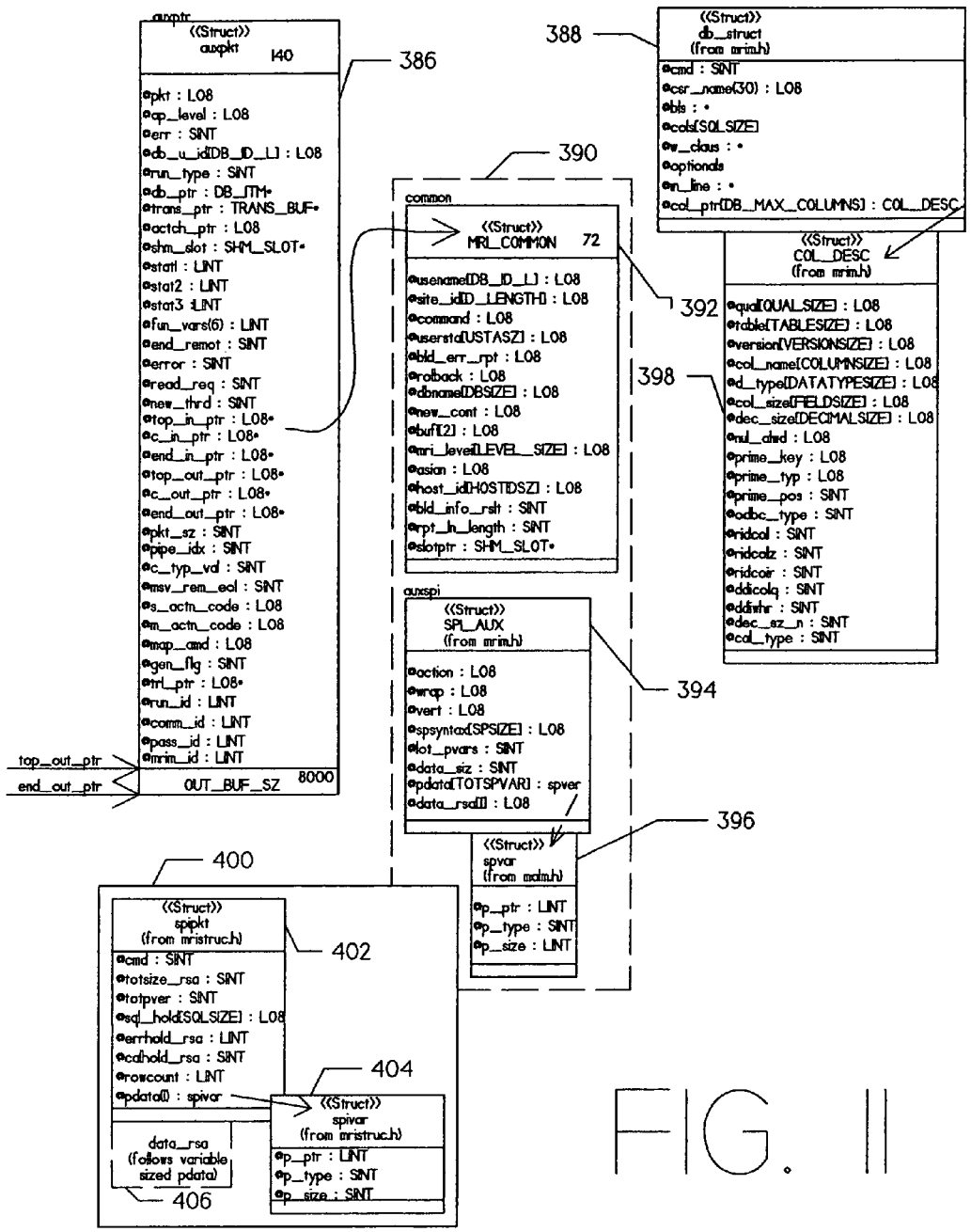
FIG. 11 is a schematic diagram showing the SPI main packet structures.

FIG. 11 is a detailed view of the main SPI packet structures. Table 386 shows the format of the auxiliary packet. This points to the MRI COMMON data structure shown as view 390. View 394 shows the format of the SPI auxiliary packet, with view 396 showing the format of the associated variables. The modified SPI packet is shown in view 400, with the main packet shown in view 402 and the variables shown in view 404. Element 406 shows the variable length of the packet. The corresponding data structures are shown in views 388 and 398.

Figure 12:
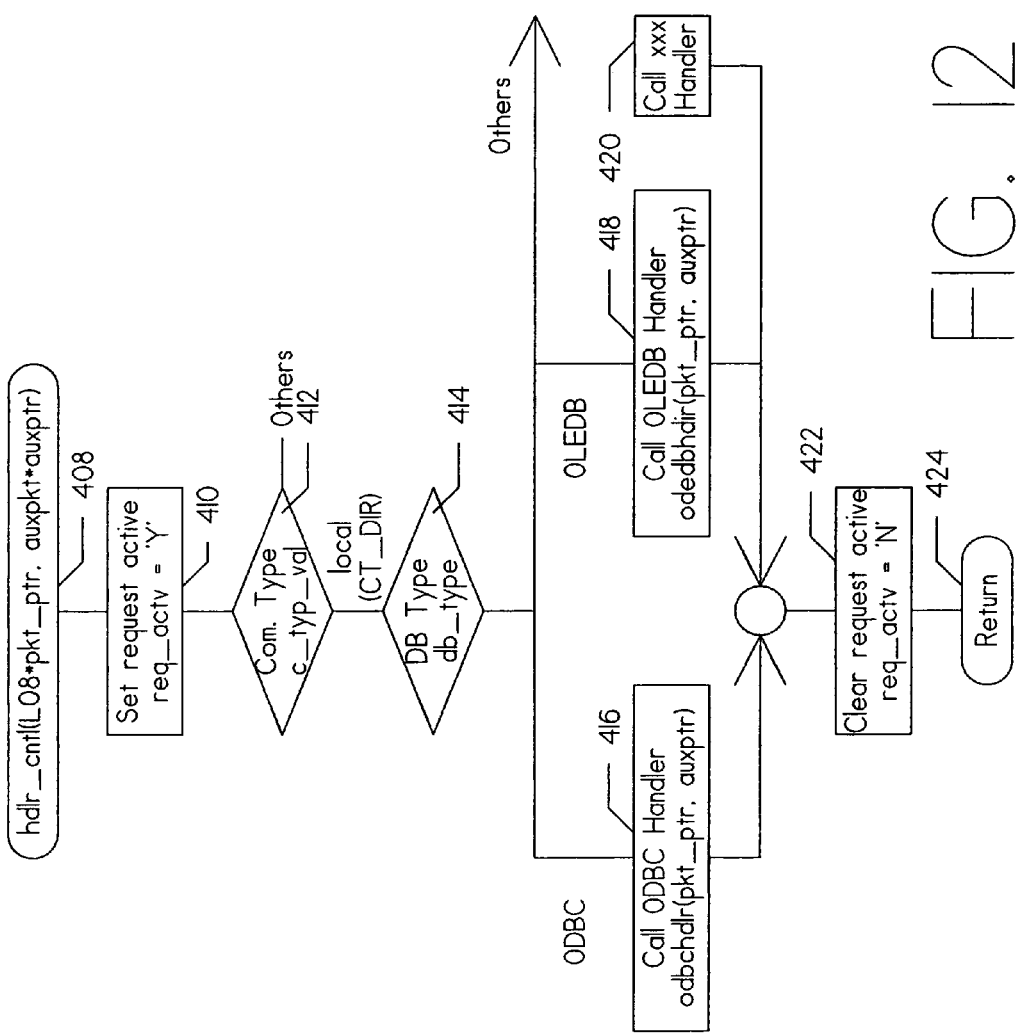
FIG. 12 is a flow chart of the hdlr_cntl( ) process flow.

FIG. 12 is a detailed flow chart of the handler process. Entry is via element 408. The request is set active at element 410. Element 412 switches on the command type. If not local, control is passed elsewhere for remote and/or error processing. If local, control is given to element 414 for determination of the requested data base type. Defined for the preferred mode of the present invention, are ODBC and OLEDB. Any other designation results in error processing or switching to other capability.

ODBC requests are made through handler 416. Similarly, OLEDB requests are made via handler 418. Element 420 provides for direct call of other data base handlers. Clearing of the active request is made at element 422, and exit is via element 424.

Figure 13:
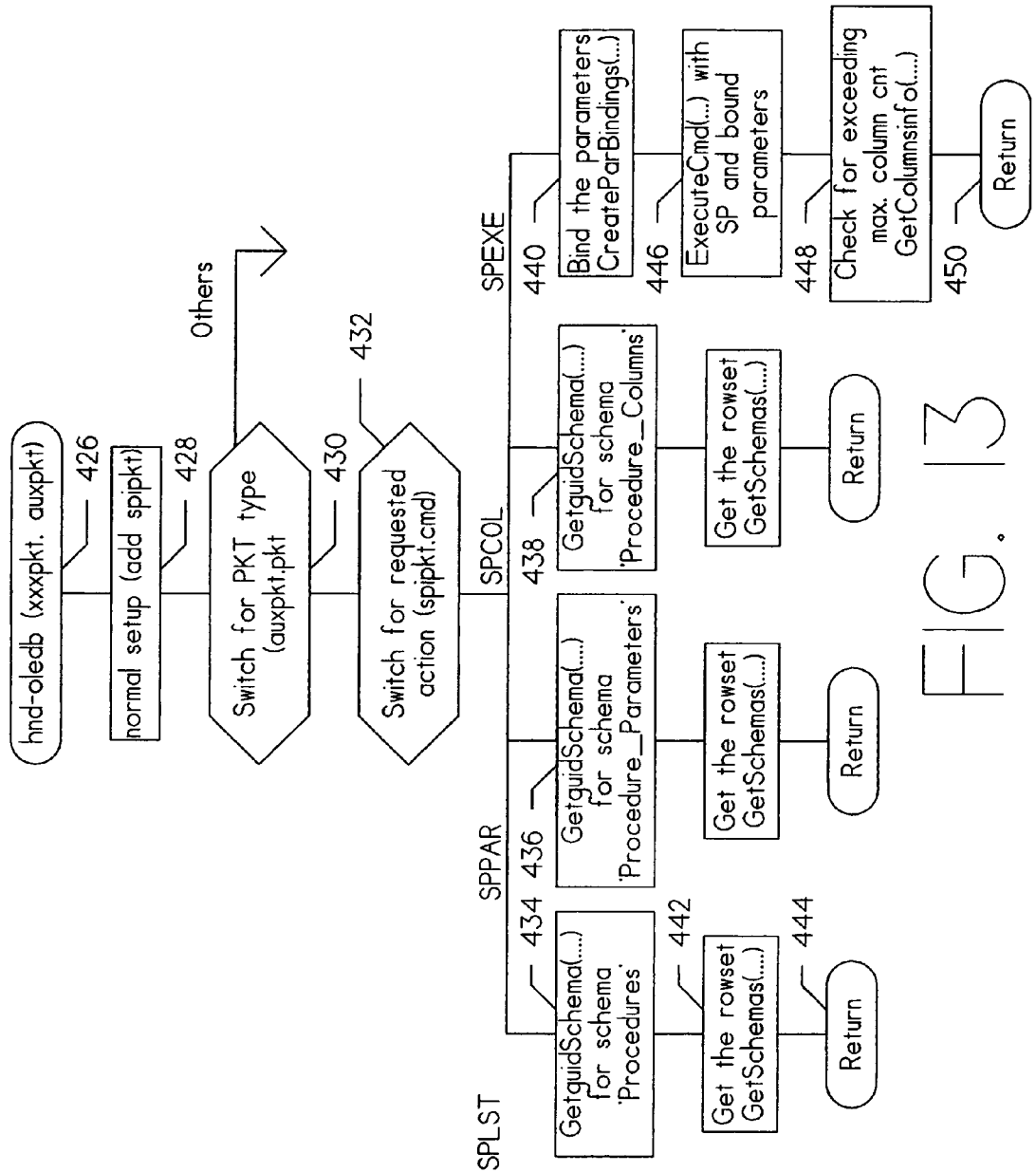
FIG. 13 is a flow chart of the SPI-PKT handling for OLEDB.

FIG. 13 is a more detailed flow chart for OLEDB handler operation (see also FIG. 12, element 418. The handler is initiated at element 426. Normal setup is performed at element 428. Element 430 switches on packet type. Again, list, parameter, column, and execution command packets are defined. Other command packets result in an error exit as shown.

Element 432 performs the switching for the defined request types. The list schema is accessed by element 434. The rowset is fetched at element 442 and exit is via element 444. The parameter schema is accessed by element 436, with further processing as previously discussed. Similarly element 438 accesses the column schema, which is completed as discussed.

The execution parameters are bound by element 440. Element 446 performs the actual execution. Error checking is performed by element 448. Exit is via 450.

Figure 14:
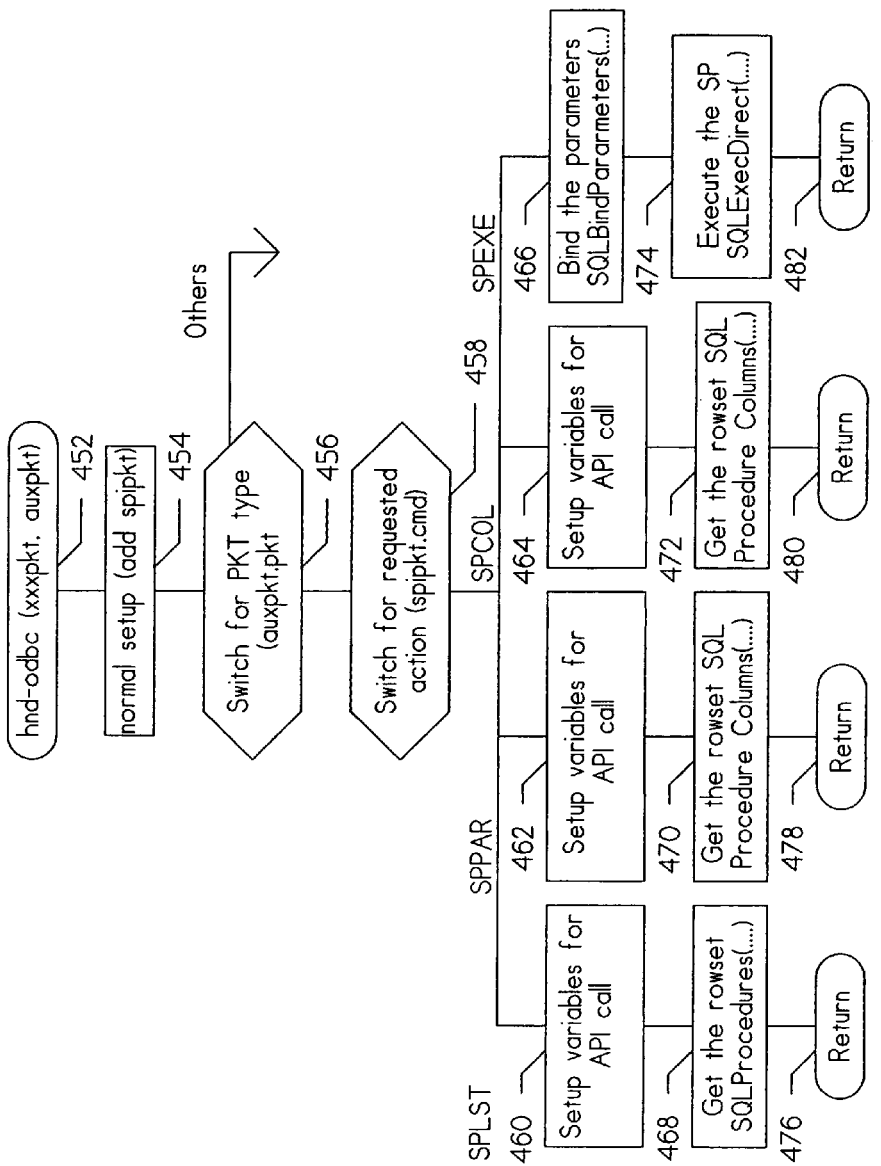
FIG. 14 is a flow chart of the HND-ODBC handler for SPI_PKT.

FIG. 14 is a more detailed flow chart of the ODBC handler (see also FIG. 12, element 416). Entry is via element 452. Normal setup is accomplished by element 454. Element 456 determines whether the requested command type is defined. As explained above, list, parameter, column, and execution commands are currently defined. An error exit is provided for any undefined command types. Packets containing defined command request types are switched by element 458.

Element 460 sets up the variables for the API call for a list command request. Element 468 fetches the rowset. Exit is via element 476. Variables for parameter command requests are set up by element 462. Element 470 fetches the SQL rowset. Exit is via element 478.

Variables for the column API call are set up by element 464. Element 472 fetches the corresponding rowset. Exit is via element 480. Element 466 binds the SQL parameters for the execution command request. The actual execution is performed at element 474. Exit is via element 482.

Having thus described the preferred embodiments of the present invention, those of skill in the art will be readily able to adapt the teachings found herein to yet other embodiments within the scope of the claims hereto attached.

We claim:

1. An apparatus comprising:
   a. a user terminal which generates a user request;
   b. a publicly accessible digital data communication network responsively coupled to said user terminal;
   c. a legacy data base management system having access to at least one data base responsively coupled to said user terminal via said publicly accessible digital data communication network; and
   d. a stored procedure having a sequence of command script statements responsively coupled to said legacy data base management system which is executed by said legacy data base management system in response to said user request.

2. The apparatus of claim 1 wherein said user terminal generates a second user request which causes said legacy data base management system to add parameters to said stored procedure.

3. The apparatus of claim 2 wherein said at least one data base further comprises an ODBC data base.

4. The apparatus of claim 3 wherein said at least one data base further comprises an OLEDB data base.

5. The apparatus of claim 4 wherein said legacy data base management system further comprises BIS.

6. A method of utilizing a user terminal to access a command language scripted stored procedure within a legacy data base management system having at least one data base comprising:
   a. transmitting a service request requesting access to said command language scripted stored procedure from said user terminal to said legacy data base management system via a publicly accessible digital data communication network;
   b. receiving said service request by said legacy data base management system;
   c. accessing said command language scripted stored procedure in accordance with said service request; and
   d. transferring an appropriate response from said legacy data base management system to said user terminal via said publicly accessible digital data communication network.

7. A method according to claim 6 wherein said accessing step further comprises executing said command language scripted store procedure corresponding to said service request by said legacy data base management system.

8. A method according to claim 7 wherein said publicly accessible digital data communication network further comprises the Internet.

9. A method according to claim 8 further comprising transferring a second service request from said user terminal to said legacy data base management system which causes said accessing step to enter parameters into said command language scripted stored procedure.

10. A method according to claim 9 wherein said legacy data base management system further comprises BIS data base management system.

11. In a data processing system having a user terminal which generates a service request responsively coupled via a publicly accessible digital data communication network to a legacy data base management system having at least one data base, the improvement comprising:
    a scripted command language stored procedure within said at least one data base which is accessed in response to said service request.

12. The improvement according to claim 11 further comprising a plurality of variables loaded into said scripted command language stored procedure in response to said service request.

13. The improvement according to claim 12 further comprising a second service request generated by said user terminal causes said legacy data base management system to execute said scripted command language stored procedure.

14. The improvement according to claim 11 wherein said publicly accessible digital data communication network further comprises the Internet.

15. The improvement according to claim 14 wherein said legacy data base management system further comprises BIS.

16. An apparatus for permitting a user to access a stored procedure comprising:
    a. a user terminal which generates a first user request containing a parameter and a second user request;
    b. a publicly accessible digital data communication network responsively coupled to said user terminal which transfers said first user request and said second user request;
    c. a legacy data base management system having access to at least one OLE DB data base responsively coupled to said user terminal via said publicly accessible digital data communication network which receives said first user request and said second user request; and
    d. a stored procedure having a sequence of command script statements responsively coupled to said legacy data base management system which is modified in accordance with said parameter of said first user request and which is executed in response to said second user request.

* * * * *